(12) United States Patent
Shereyk et al.

(10) Patent No.: US 9,049,917 B2
(45) Date of Patent: Jun. 9, 2015

(54) WEB LOAD-DAMPENING DEVICE

(75) Inventors: David A. Shereyk, Glenview, IL (US); John S. Pontaoe, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 161 days.

(21) Appl. No.: 13/878,922

(22) PCT Filed: Nov. 11, 2011

(86) PCT No.: PCT/US2011/060410
§ 371 (c)(1),
(2), (4) Date: Apr. 11, 2013

(87) PCT Pub. No.: WO2013/065088
PCT Pub. Date: May 18, 2012

(65) Prior Publication Data
US 2013/0221052 A1    Aug. 29, 2013

Related U.S. Application Data

(60) Provisional application No. 61/413,145, filed on Nov. 12, 2010.

(51) Int. Cl.
*A45F 3/04* (2006.01)
*F16F 1/46* (2006.01)
*A45F 3/12* (2006.01)
*A45F 3/00* (2006.01)

(52) U.S. Cl.
CPC ... *A45F 3/04* (2013.01); *F16F 1/46* (2013.01); *A45F 3/00* (2013.01); *A45F 3/047* (2013.01); *A45F 3/12* (2013.01)

(58) Field of Classification Search
CPC .......................................................... F16F 1/46
USPC ............................... 224/264; 24/71.1; 267/69
See application file for complete search history.

(56) References Cited

U.S. PATENT DOCUMENTS

| | | | | |
|---|---|---|---|---|
| 349,904 A * | 9/1886 | Sauder | ............................ | 267/69 |
| 750,112 A * | 1/1904 | King | ................................ | 267/69 |
| 863,548 A * | 8/1907 | Martin | ............................. | 267/69 |
| 1,509,012 A * | 9/1924 | Whiting | ......................... | 114/215 |
| 1,619,452 A * | 3/1927 | Whitehill | ........................ | 267/69 |
| 2,878,013 A * | 3/1959 | Piodi | ............................... | 267/69 |
| 3,021,580 A * | 2/1962 | Rowitz | ........................... | 24/71.1 |
| 3,339,911 A * | 9/1967 | Af Strom | ........................ | 267/69 |
| 3,869,114 A * | 3/1975 | Schneider | ....................... | 267/69 |
| 4,144,620 A * | 3/1979 | Schaeffer | ....................... | 24/71.1 |
| 4,754,957 A * | 7/1988 | Muttart | .......................... | 267/136 |
| 5,449,151 A * | 9/1995 | Johnson | .......................... | 267/71 |
| 5,450,995 A * | 9/1995 | Perrin | ............................ | 224/254 |
| 5,695,102 A * | 12/1997 | Jackson | ......................... | 224/264 |
| 5,712,011 A * | 1/1998 | McMahon et al. | ........... | 428/36.9 |

(Continued)

OTHER PUBLICATIONS

International Search Report and Written Opinion corresponding to PCT/US2011/060410, dated Jun. 21, 2012.

*Primary Examiner* — Justin Larson

(57) ABSTRACT

A device is configured to adjustably retain at least one strap and dampen forces exerted into or by the at least one strap. The device includes a main body including at least one strap adjustment channel configured to adjustably retain the at least one strap, and at least one tensile member formed on or within the main body. The at least one tensile member is configured to flex, bend, and/or stretch in order to absorb the forces exerted into or by the at least one strap.

21 Claims, 8 Drawing Sheets

(56) References Cited

U.S. PATENT DOCUMENTS

| | | | | |
|---|---|---|---|---|
| 5,884,827 A | * | 3/1999 | Stein | 224/614 |
| 5,915,608 A | * | 6/1999 | Mao | 224/257 |
| D646,895 S | * | 10/2011 | Nolan et al. | D3/327 |
| 8,132,699 B2 | * | 3/2012 | Hess et al. | 224/264 |
| 8,366,081 B2 | * | 2/2013 | Staihar | 267/69 |
| 2003/0056338 A1 | | 3/2003 | Anscher | |
| 2005/0258205 A1 | | 11/2005 | French | |
| 2007/0261213 A1 | * | 11/2007 | Nolan et al. | 24/300 |
| 2008/0142557 A1 | | 6/2008 | Hess et al. | |
| 2008/0265477 A1 | * | 10/2008 | Staihar | 267/113 |

* cited by examiner

WEB LOAD-DAMPENING DEVICE

RELATED APPLICATIONS

This application is a National Phase of International Application Number PCT/US2011/060410, filed Nov. 11, 2011, and claims priority benefits from U.S. Provisional Patent Application No. 61/413,145 filed Nov. 12, 2010.

FIELD OF EMBODIMENTS OF THE INVENTION

Embodiments of the present invention generally relate to a web load dampening-device configured to be used with backpack straps, for example.

BACKGROUND

Various items include adjustable webs or straps. For example, a backpack includes shoulder straps or webs that may be adjusted so that they conform to a user's preferences. Additionally, various helmets include adjustable straps connected to a chin strap that may be adjusted to provide a snug, yet comfortable, fit for a wearer.

FIG. 1 illustrates a conventional web-adjustment system 10. The system 10 includes a strap 12 adjustably connected to an adjustment member 14. The adjustment member 14 is known as a ladderlock, which is used to take up slack and tighten the strap 12 with respect to a user for a snug fit. Ladderlocks are configured to provide snug adjustment of webbing on a backpack, for example.

As shown in FIG. 1, the adjustment member 14 includes a main body 16 having web channels 18 formed at opposite ends. The channels 18 are configured to allow the strap 12 or straps to pass therethrough. The strap 12 slidably secures around horizontal bars or beams that define the web channels 18.

Current web-adjustment systems, such as ladderlocks, configured for use with such items as backpacks, are susceptible to shocks that may be transferred to the wearer or user. For example, as an individual runs with a backpack on, the running motion may cause the backpack to shift up and down or from side-to-side. The shock of this motion is translated to the wearer's back, shoulder, and/or arms, causing discomfort and/or fatigue, for example.

SUMMARY OF EMBODIMENTS OF THE INVENTION

Certain embodiments of the present invention provide a device configured to adjustably retain at least one strap and dampen forces exerted into or by the at least one strap. The device includes a main body including at least one strap adjustment channel configured to adjustably retain the at least one strap, and at least one tensile member or shock-absorber formed on or within the main body. The at least one tensile member is configured to flex, bend, and/or stretch in order to absorb the forces exerted into or by the at least one strap.

The at least one tensile member may include a plurality of tension bars that are perpendicular to the at least one strap adjustment channel. Two of the plurality of tension bars may be separated by an internal slot formed through the main body.

The main body may include inwardly-curved walls integrally connected to rounded ends. A central longitudinal slot may be formed within the main body. The central longitudinal slot may be perpendicular to the at least one strap adjustment channel. The at least one tensile member may include two tension members on either side of the longitudinal slot.

The at least one tensile member may include a flexible cylinder integrally connected to cylindrical cross beams that are perpendicular to the flexible cylinder. The at least one strap adjustment channel may be formed through at least one of the cylindrical cross beams.

The main body may be rectangular. The at least one tensile member may include flexible walls separated by a central rectangular opening.

The main body may have an I-beam cross-section. The tensile member may include a longitudinal post having a rib and recessed edges.

The at least one tensile member may include first and second tensile members that are perpendicular with one another.

The at least one tensile member may include first and second shock absorbing members integrally connected to a hinge member.

Each of the first and second shock absorbing members may include a first concave cell connected to intermediate convex cells that are in turn connected to a second concave cell. The first concave cell may be connected to a web adjustment member and the second concave cell may be connected to the hinge member. A separate strap or web may be looped between opposed second concave cells.

The hinge member may include a plurality of living hinges.

Each of the first and second shock absorbing members may include a first concave cell connected to an intermediate convex cell that is in turn connected to a second concave cell. The first and second concave cells may each define a first central cavity, and the intermediate convex cell may define a second central cavity. The second central cavity may be larger than the first central cavity.

Each of the first and second shock absorbing members may include first and second convex cells integrally connected to one another through a concave post.

Each of the first and second shock absorbing members may include a single convex cell integrally connected to the hinge member through a concave post.

Each of the first and second shock absorbing members may include a single internal passage formed therethrough without any internal walls defining individual cells.

The at least one tensile member may include first and second shock absorbing members that are only connected to one another through an adjustable web.

The main body may be formed as an integral piece of one or more of rubber, plastic resin, polyester, santoprene, thermoplastic elastomer (TPE), or thermoplastic polyurethane (TPU).

Certain embodiments of the present invention provide a device configured to adjustably retain straps and dampen forces exerted into or by the straps. The device may include a main body formed as an integral piece of one or more of rubber, plastic resin, polyester, santoprene, thermoplastic elastomer (TPE), or thermoplastic polyurethane (TPU). The main body includes two strap adjustment channels at opposite ends configured to adjustably retain the straps.

The device may also include shock-absorbing members formed on or within the main body. The shock-absorbing members are configured to flex, bend, and/or stretch in order to absorb the forces exerted into or by the straps.

Certain embodiments of the present invention provide a backpack adjustment assembly. The assembly includes a main body formed as an integral piece of one or more of rubber, plastic resin, polyester, santoprene, thermoplastic elastomer (TPE), or thermoplastic polyurethane (TPU). The main body includes a first strap adjustment channel at a first end and a second strap adjustment channel at a second end that is opposite the first end.

The assembly also includes a first backpack strap adjustably retained within the first strap adjustment channel, and a second backpack strap adjustably retained within the second strap adjustment channel.

The assembly also includes shock absorbers formed on or within the main body. The shock absorbers are configured to flex, bend, and/or stretch in order to absorb the forces exerted into or by the first and second backpack straps.

Figure 1:
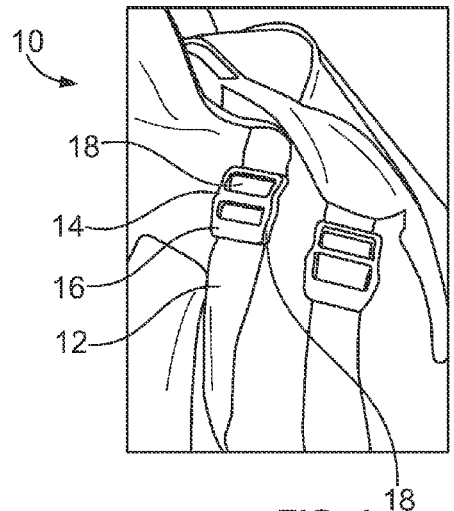
FIG. 1 illustrates a conventional web-adjustment system.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 2:
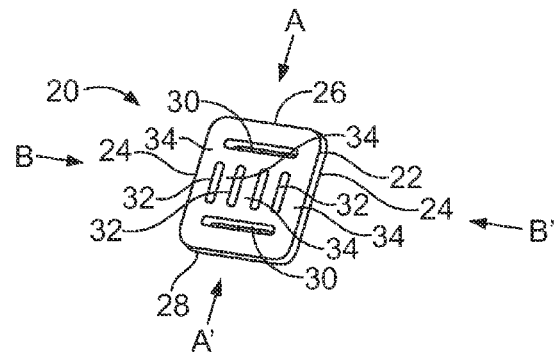
FIG. 2 illustrates an isometric view of a web load-dampening device, according to an embodiment of the present invention.

FIG. 2 illustrates an isometric view of a web load-dampening device 20, according to an embodiment of the present invention. The device 20 may be formed as an integral piece of rubber, plastic resin, polyester, santoprene, thermoplastic elastomer (TPE), thermoplastic polyurethane (TPU), or the like.

The device 20 includes a main body 22 defined by lateral walls 24 integrally formed and connected with a top wall 26 and a bottom wall 28. Web channels 30 are formed through the top and bottom walls 26 and 28. The web channels 30 are configured to receive and adjustably retain a strap or web, such as that of a backpack or chin strap of a helmet.

Internal slots or channels 32 are formed within the main body 22 between the web channels 30. The internal slots 32 are oriented perpendicular to the web channels 30. In this manner, a series of longitudinal tension bars, columns, or spring members 34 are formed between the internal slots 32. Outer tension bars 34 are defined by the portions of the lateral walls 24 alongside the outermost internal channels 32.

Because the device 20 is integrally formed of a flexible material, such as TPE or TPU, as noted above, the tension bars 34 are flexible and are able to flex into and out of the internal channels 32. For example, if the device 20 is compressed in the directions of arrows A and/or A', the outermost tension bars 34 bow out to absorb the force, while the inner tension bars 34 flex into or out of the internal channels 32. Similarly, if the device 20 is squeezed in the directions of arrows B and/or B', the flexible tension bars 34 bend inwardly, thereby absorbing the force. In this manner, the device 20 is able to absorb shocks. Consequently, exerted forces or shocks are substantially dampened so that the shocks are not translated to a wearer.

Figure 3:
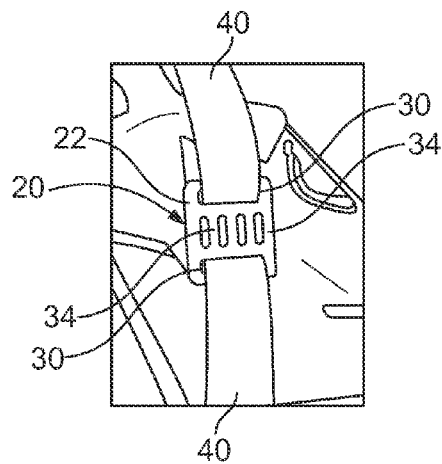
FIG. 3 illustrates an isometric view of straps adjustably secured to a web load-dampening device, according to an embodiment of the present invention.

FIG. 3 illustrates an isometric view of straps 40 adjustably secured to the web load-dampening device 20, according to an embodiment of the present invention. One strap 40 is adjustably secured within a top web channel 30, while another strap 40 is adjustably secured within a bottom web channel 30. Forces exerted into the device 20 by the straps 40 are absorbed by the tension bars 34, as described above. That is, the flexible tension bars 34 flex, bow, and/or bend to dampen forces exerted into the main body 22 of the device 20.

Figure 4:
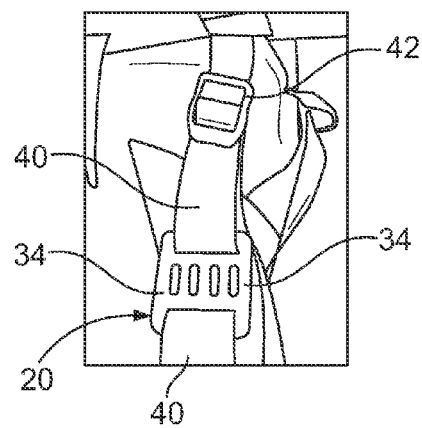
FIG. 4 illustrates an isometric view of straps secured to a web load-dampening device and a conventional adjustment member, according to an embodiment of the present invention.

FIG. 4 illustrates an isometric view of straps 40 secured to a web load-dampening device 20 and a conventional adjustment member 42, according to an embodiment of the present invention. The adjustment member 42 is a ladderlock, as described with respect to FIG. 1. Thus, the device 20 may be added to an existing web-adjustment system in order to retrofit the system for load-dampening. Alternatively, the device 20 may replace the conventional adjustment member, such as shown in FIG. 3.

Figure 5:
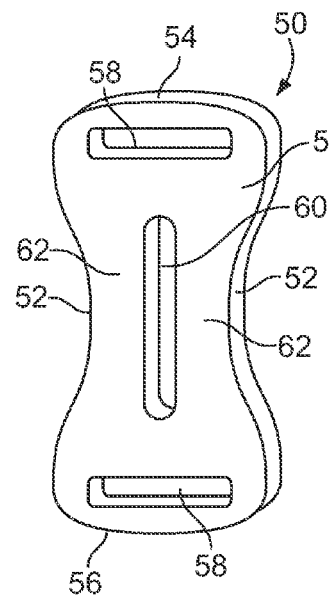
FIG. 5 illustrates an isometric view of a web load-dampening device, according to an embodiment of the present invention.

FIG. 5 illustrates an isometric view of a web load-dampening device 50, according to an embodiment of the present invention. The device 50 may be formed of the same material as the device 20 (shown in FIGS. 2-4).

The device 50 includes a main body 51 having inwardly-curved lateral walls 52 integrally formed with rounded top and bottom walls 54 and 56, respectively. The shape of the main body 51 resembles that of a dog-bone. Web channels 58 are formed proximate the top and bottom walls 54 and 56. A single internal longitudinal slot 60 is formed within the main body 51. The slot 60 is formed along a longitudinal central axis of the device 50. As such, curved tension members 62 are formed on either side of the slot 60. The tensions members 62 are configured to flex into and away from the slot 60, depending on the force vectors exerted into the main body 51. The inwardly-curved lateral walls 52 provide resilience to the tension bars 62. That is, the curved surfaces are able to withstand greater forces than straight surfaces.

Figure 6:
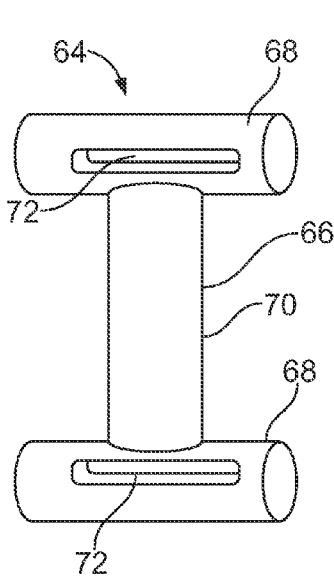
FIG. 6 illustrates an isometric view of a web load-dampening device, according to an embodiment of the present invention.

FIG. 6 illustrates an isometric view of a web load-dampening device 64, according to an embodiment of the present invention. The device 64 may be formed of the same material as the device 20 (shown in FIGS. 2-4). The device 64 includes a main body 66 having cylindrical terminal cross bars 68 integrally formed with a cylindrical connecting bar 70 that forms a tension bar. Web channels 72 are formed through the cross bars 68. The connecting bar 70 allows the main body 66 to flex, bend, pivot, and the like, thereby allowing the device 64 to absorb shocks. The rounded, cylindrical surfaces of the cross bars 68 and the connecting bar 70 provides a resilient, strong, yet flexible device 64.

Figure 7:
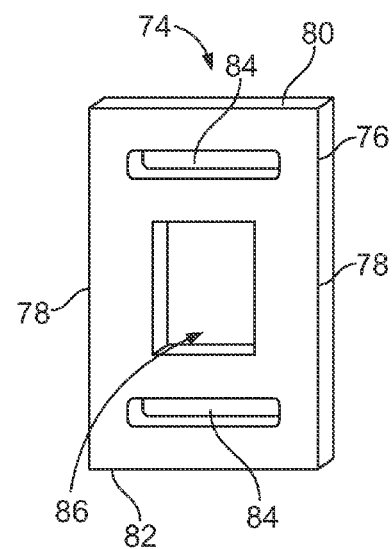
FIG. 7 illustrates an isometric view of a web load-dampening device, according to an embodiment of the present invention.

FIG. 7 illustrates an isometric view of a web load-dampening device 74, according to an embodiment of the present invention. The device 74 may be formed of the same material as the device 20 (shown in FIGS. 2-4). The device 74 includes a main body 76 having lateral tension bars 78 integrally formed with top and bottom beams 80 and 82. Web channels 84 are formed through the top and bottom beams 80 and 82. A central opening 86 is formed within a central area of the device 74. As such, the lateral tension bars 78 are able to flex, bend, and the like with respect to the central opening 86.

Figure 8:
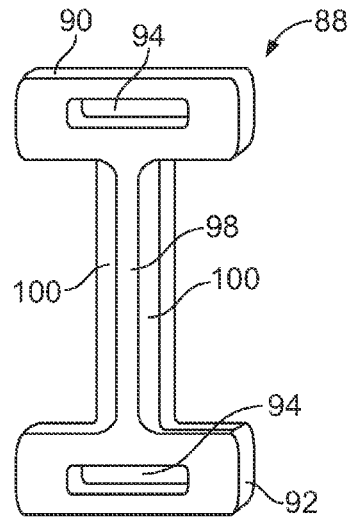
FIG. 8 illustrates an isometric view of a web load-dampening device, according to an embodiment of the present invention.

FIG. 8 illustrates an isometric view of a web load-dampening device 88, according to an embodiment of the present invention. The device 88 may be formed of the same material as the device 20 (shown in FIGS. 2-4). The device 88 resembles an I-beam. The device 88 includes upper and bottom cross beams 90 and 92 having web channels 94 formed therethrough. A central longitudinal tension bar, column, beam, or the like 96 integrally spans between the upper and bottom cross beams 90 and 92. The tension bar 96 has a longitudinal rib 98 and recessed lateral edges 100 on either side of the rib 98. The rib 98 adds support, while the recessed lateral edges 100 provide flexibility and less material for manufacture, thereby providing material cost-savings.

Figure 9:
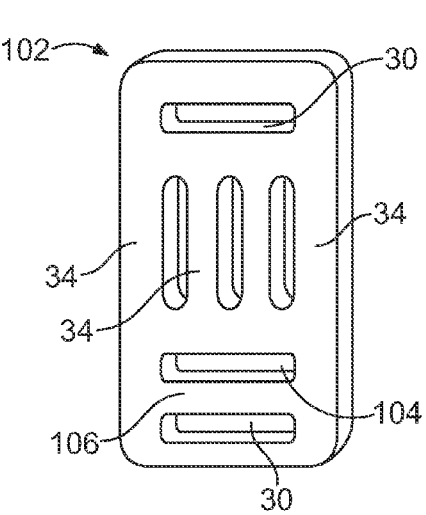
FIG. 9 illustrates an isometric view of a web load-dampening device, according to an embodiment of the present invention.

FIG. 9 illustrates an isometric view of a web load-dampening device 102, according to an embodiment of the present invention. The device 102 may be formed of the same material as the device 20 (shown in FIGS. 2-4). The device 102 is similar to the device 20, except that the device 102 includes three tension bars 34 instead of four. More or less tension bars 34 than those shown in FIGS. 2 and 9 may be used.

Additionally, a slot 104 is formed above the lower web channel 30, thereby forming a tension bar 106 between the slot 104 and the web channel 30. The tension bar 106 is perpendicular to the tension bars 34. The tension bar 106 is able to absorb forces exerted from different directions than the tension bars 34. For example, the tension bar 106 may flex into or away from either the web channel 30 or the slot 104. Additional tension bars 106 may be used. Also, tension bars 106 may be formed proximate the top web channel 30 in addition to, or in lieu of, the tension bar 106 proximate the bottom web channel 30.

Figure 10:
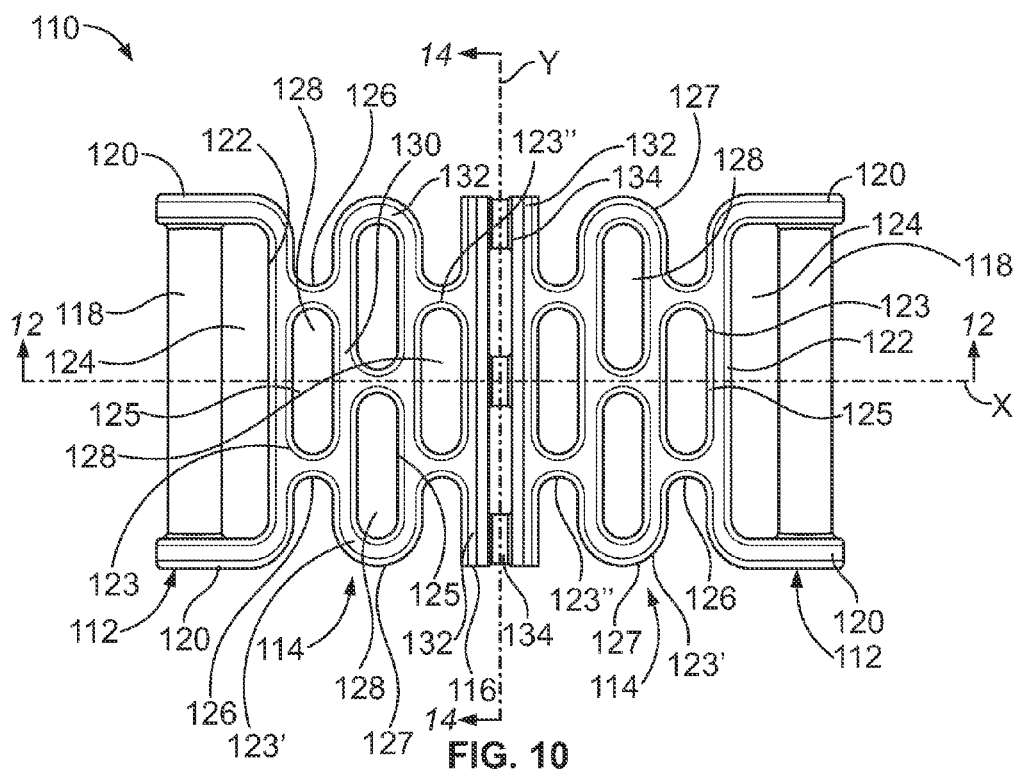
FIG. 10 illustrates a top plan view of a web load-dampening device, according to an embodiment of the present invention.
Figure 11:
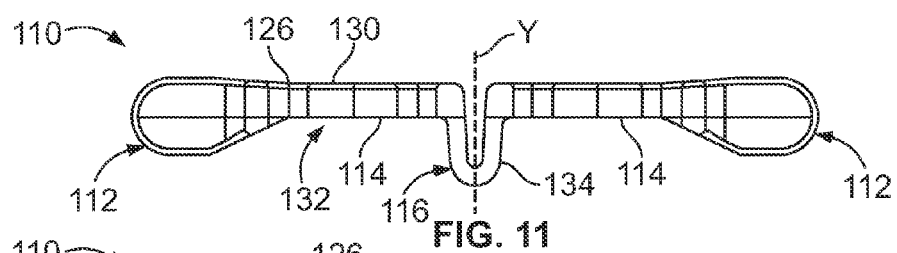
FIG. 11 illustrates a transverse lateral view of a web load-dampening device, according to an embodiment of the present invention.
Figure 12:
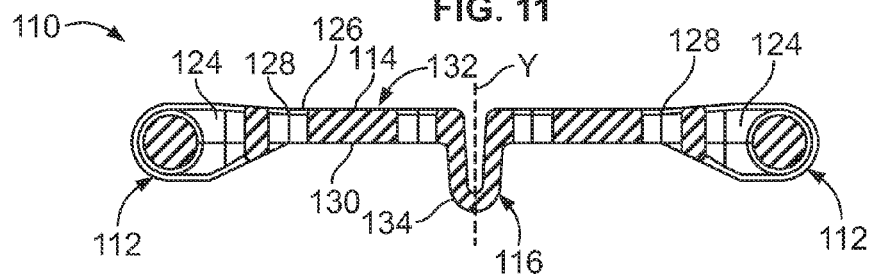
FIG. 12 illustrates a cross-sectional view of a web load-dampening device through line 12-12 of FIG. 10, according to an embodiment of the present invention.
Figure 13:
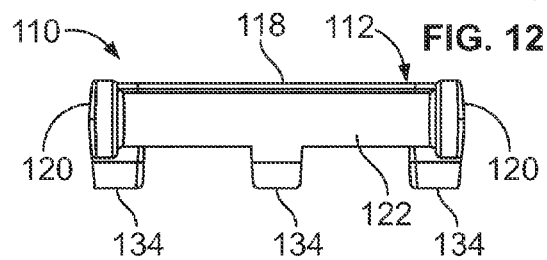
FIG. 13 illustrates an end view of a web load-dampening device, according to an embodiment of the present invention.
Figure 14:
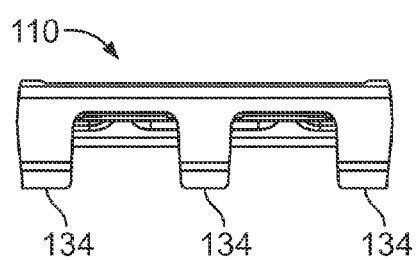
FIG. 14 illustrates a cross-sectional view of a web load-dampening device through line 14-14 of FIG. 10, according to an embodiment of the present invention.

FIG. 10 illustrates a top plan view of a web load-dampening device 110, according to an embodiment of the present invention. FIG. 11 illustrates a transverse lateral view of the web load-dampening device 110. FIG. 12 illustrates a cross-sectional view of the web load-dampening device 110 through line 12-12 of FIG. 10. FIG. 13 illustrates an end view of the web load-dampening device 110. FIG. 14 illustrates a cross-sectional view of the web load-dampening device 110 through line 14-14 of FIG. 10.

Referring to FIGS. 10-14, the device 110 includes opposing web-adjustment members 112 integrally connected to shock-absorbing members 114 that are, in turn, connected to each other through a central hinged beam 116.

Each web-adjustment member 112 includes a planar receiving beam 118 connected to lateral struts 120 that are in turn connected to a cross beam 122. A web channel 124 is formed between the receiving beam 118, the lateral struts 120 and the cross beam 122. A web or strap is configured to be adjustably retained within the web channel 124.

Each cross beam 122 is integrally connected to a shock-absorbing member 114. Each shock absorbing member 114 includes a plurality of shock-absorbing cells 123. Each cell 123 is defined by resilient, curved posts 126 connected to straight beams 125. Within each cell, a central cavity 128 is defined between the posts 126 and the beams 125. The central cavity 128 has a pill-shaped cross-section having a generally rectangular body with outwardly rounded or convex ends. The posts 126 connected to the cross beam 122 are also connected to a cross beam 130 having two aligned rounded cavities 128 formed therethrough.

As shown in FIG. 10, the shock absorbing member 114 provides a stacked cell configuration having a first cell 123 with concave outer posts 126 connected to the cross beam 122, aligned second cells 123' within an intermediate portion 132 having convex outer walls 127, and a third cell 123" having concave outer posts 126 connected to the central hinged beam 116. A central axis x of the device 110 bisects the opening 128 of the first cell 123 proximate the cross beam 122. The central axis x passes between the aligned rounded openings 128 of the second cells 123' within the intermediate portion 132. The central axis x then bisects the single rounded opening 128 of the third cell 123" connected to the central hinged beam 116.

The central hinged beam 116 includes straight beams 132 pivotally secured together through evenly spaced living hinges 134. As shown in FIGS. 10-12, the device 110 is symmetrical about an axis y that is perpendicular to the axis x. As such, the halves of the device 110 about the axis y mirror one another.

The cells 123, 123', and 123" provide rounded surfaces defining pill-shaped openings 128 that provide increased shock-absorbing flexibility. The openings 128 provide ample room for the walls of the shock absorbing members 114 on either side of the axis y to flex, bend, and otherwise move in relation to forces exerted on the device 110. The hinges 134 provide additional flexibility to the device 110 in that the device 134 may pivot, bend, and flex about a pivot axis that passes through the hinges 134. More or less hinges 134 may be used. Alternatively, a single continuous hinge may span along the entire y axis of the central hinged beam 116.

Figure 15:
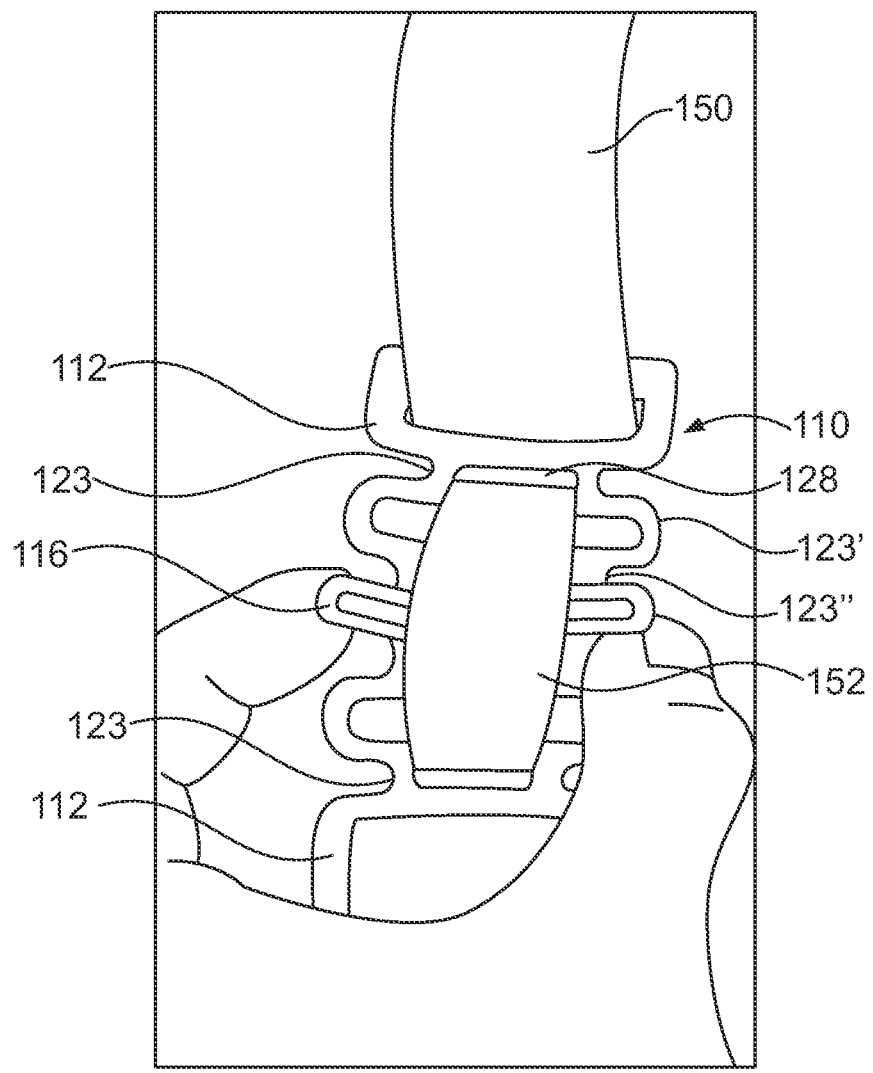
FIG. 15 illustrates an isometric view of a web load-dampening device adjustably secured to straps, according to an embodiment of the present invention.

FIG. 15 illustrates an isometric view of the web load-dampening device 110 adjustably secured to straps 150, according to an embodiment of the present invention. As shown in FIG. 15, wide straps 150 are adjustably secured to the web-adjusting members 112. A thinner strap 152 is looped through the cavities 128 of distally located cells 123 in order to provide additional securing strength for the device 110. Optionally, the thinner strap 152 is not used. However, the thinner strap 152 may also act as a shock absorber. Therefore, the cells 123, 123', and 123", and the thinner strap 152 cooperate to provide a device that absorbs forces exerted into the device.

Additionally, as shown in FIG. 15, the central hinged beam 116 is configured to be flexible, such that an operator may manipulate the ends upwardly or downwardly. The flexible nature of the central hinged beam 116 is able to absorb shocks in this manner.

The central hinged beam 116 will be more flexible with thinner hinges 134 and/or wider spaces between the hinges 134. For example, if only one central hinge 134 is used, the device 110 will be freer to bend and rotate about the central hinge 134, as compared to three hinges 134.

Figure 16:
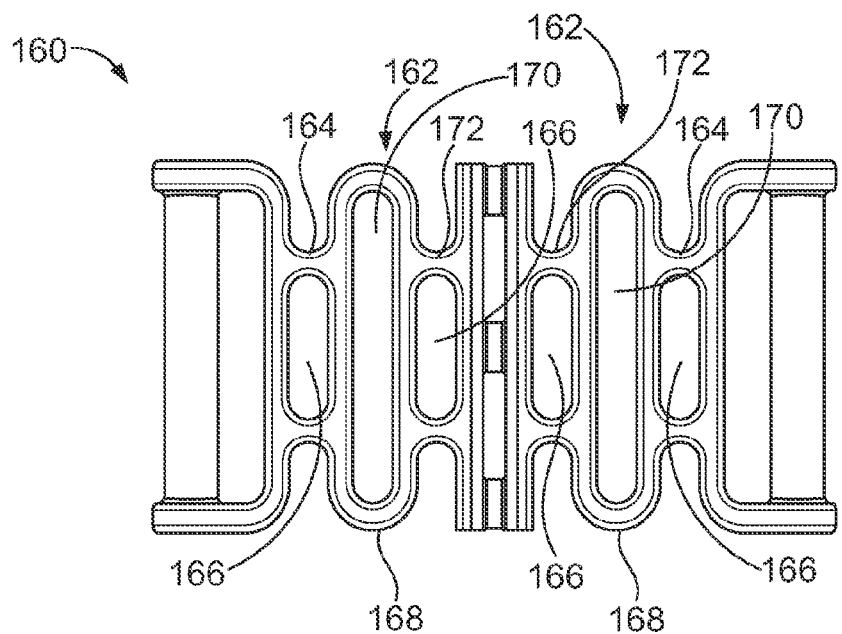
FIG. 16 illustrates a top plan view of a web load-dampening device, according to an embodiment of the present invention.

FIG. 16 illustrates a top plan view of a web load-dampening device 160, according to an embodiment of the present invention. The device 160 is similar to the device 110, except that, instead of aligned cells 123' in the intermediate portion, the device includes mirrored shock-absorbing members 162, each of which includes a base concave cell 164 (that is, the concave cell proximate the base) having a small cavity 166, an integrally connected intermediate convex cell 168 having a larger cavity 170, and a concave hinge cell 172 (that is, the concave cell proximate the hinge) having a small cavity 166.

Figure 17:
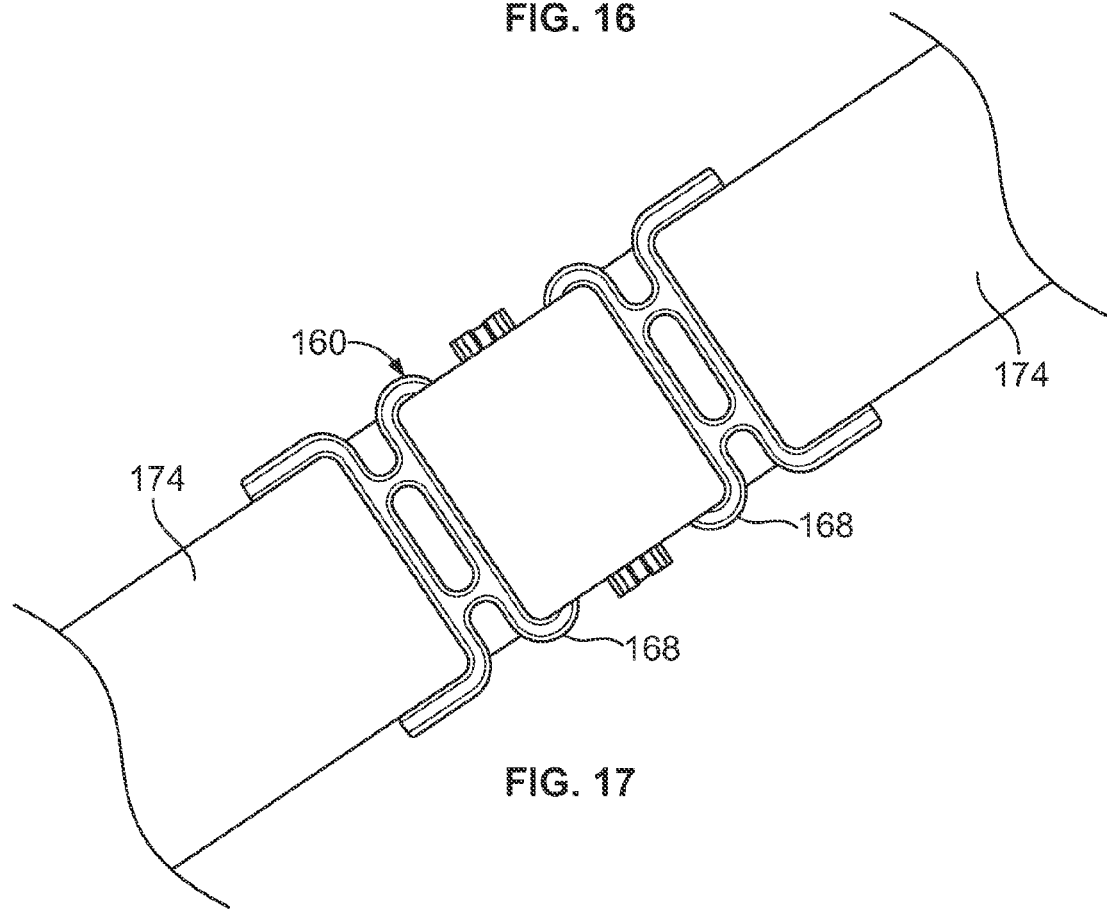
FIG. 17 illustrates an isometric view of a web load-dampening device adjustably secured to straps, according to an embodiment of the present invention.

FIG. 17 illustrates an isometric view of the web load-dampening device 160 adjustably secured to straps 174, according to an embodiment of the present invention. Referring to FIGS. 16 and 17, the large cavities 170 allow for a wider strap to pass through the intermediate convex cells 168, in order to provide an increased shock-absorbing interior supporting connection within the device 160.

Figure 18:
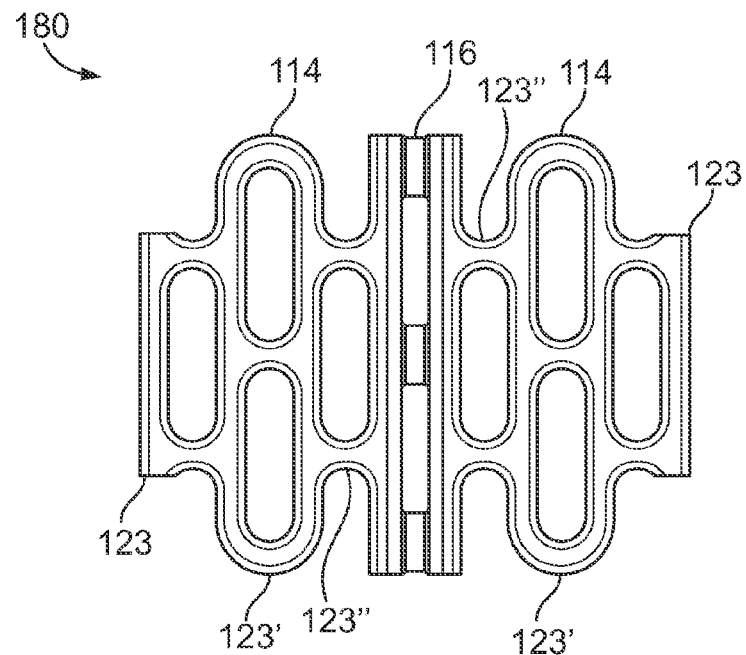
FIG. 18 illustrates a top plan view of a web load-dampening device, according to an embodiment of the present invention.

FIG. 18 illustrates a top plan view of a web load-dampening device 180, according to an embodiment of the present invention. The device 180 is similar to the device 110, except the device 180 does not include the web-adjustment members 112. Instead, the device 180 includes two mirrored shock-absorbing members 114 connected by a central hinge member 116.

Figure 19:
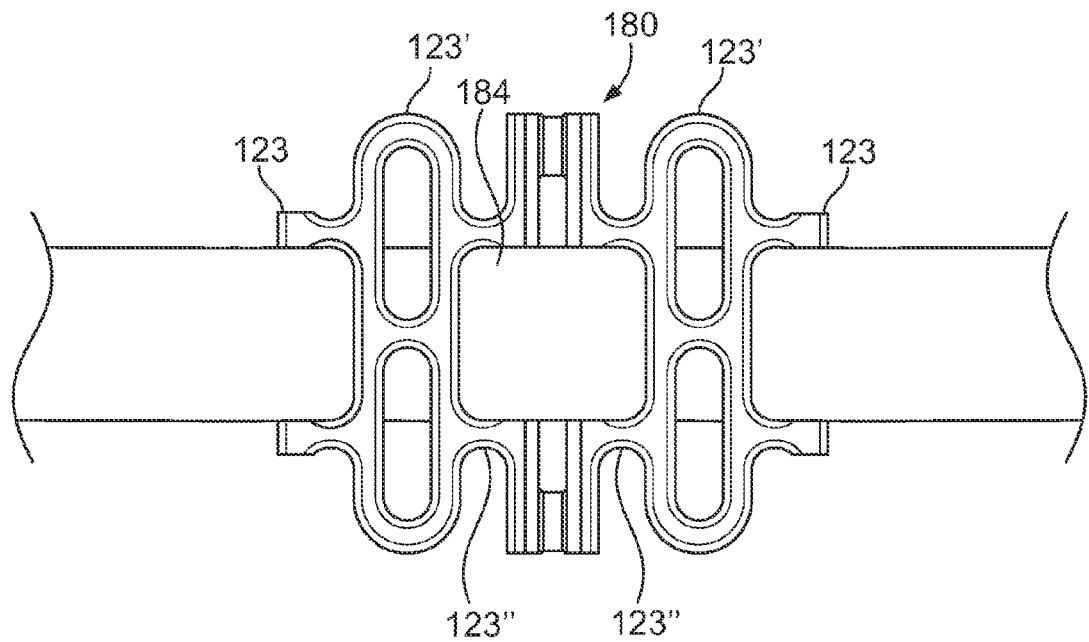
FIG. 19 illustrates an isometric view of a web load-dampening device adjustably secured to straps, according to an embodiment of the present invention.

FIG. 19 illustrates an isometric view of the web load-dampening device 180 adjustably secured to thin straps 182, according to an embodiment of the present invention. Referring to FIGS. 18 and 19, the terminal concave cells 123 are configured to adjustably retain the thin straps 182. A shock-absorbing thin strap 184 may also be looped between the opposing hinge cells 123", in order to provide additional shock absorption.

Figure 20:
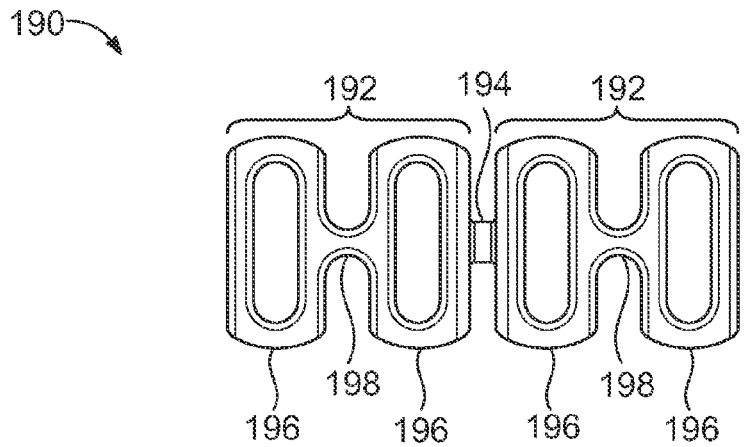
FIG. 20 illustrates a top plan view of a web load-dampening device, according to an embodiment of the present invention.

FIG. 20 illustrates a top plan view of a web load-dampening device 190, according to an embodiment of the present invention. The device 190 includes mirrored shock-absorbing members 192 secured to one another through a living hinge 194.

Each shock-absorbing member 192 includes a convex cell 196 linearly connected to another convex cell 196 through a concave post 198 that generally is aligned along the central longitudinal axis of the device 190.

Figure 21:
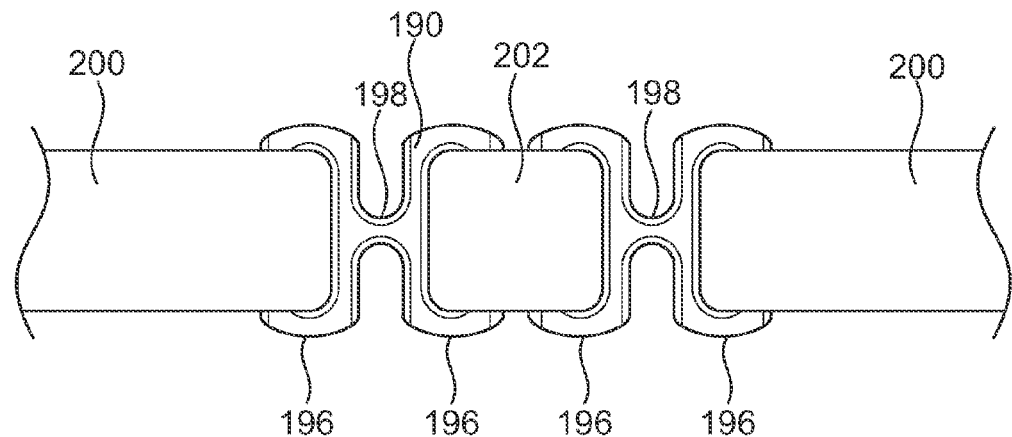
FIG. 21 illustrates an isometric view of a web load-dampening device adjustably secured to straps, according to an embodiment of the present invention.

FIG. 21 illustrates an isometric view of the web load-dampening device 190 adjustably secured to straps 200, according to an embodiment of the present invention. As shown, thin straps 200 may be adjustably secured to terminal convex cells 196. An interior shock-absorbing thin strap 202 may be looped between inner convex cells 196.

Figure 22:
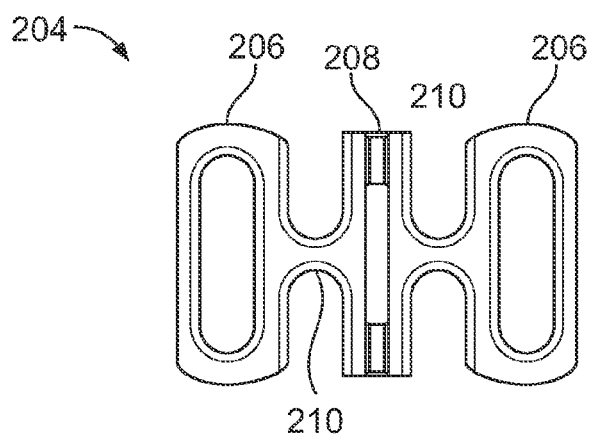
FIG. 22 illustrates a top plan view of a web load-dampening device, according to an embodiment of the present invention.

FIG. 22 illustrates a top plan view of a web load-dampening device 204, according to an embodiment of the present invention. In this embodiment, the device 204 includes mirrored convex cells 206 integrally connected to a central hinge 208 through concave posts 210.

Figure 23:
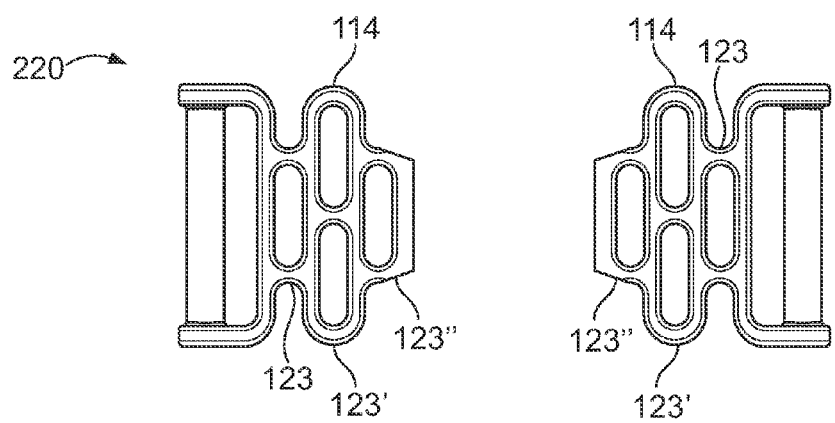
FIG. 23 illustrates a top plan view of a web load-dampening device, according to an embodiment of the present invention.

FIG. 23 illustrates a top plan view of a web load-dampening device 220, according to an embodiment of the present invention. The device 220 is similar to the device 110 shown in FIGS. 10-14, except no central hinge member connects the shock-absorbing members 114 together. This embodiment allows the mirrored shock-absorbing members to be connected together with an adjustable strap, in order to adjust the total length of the device 220.

Figure 24:
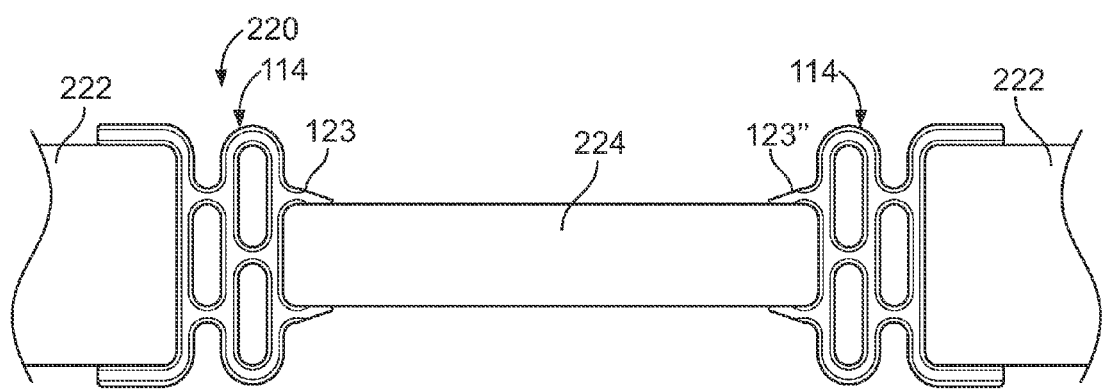
FIG. 24 illustrates an isometric view of a web load-dampening device adjustably secured to straps, according to an embodiment of the present invention.

FIG. 24 illustrates an isometric view of the web load-dampening device 220 adjustably secured to straps 222, according to an embodiment of the present invention. As shown in FIG. 24, a central thin strap 224 is looped between the cells 123", in order to provide a long device 220 having an adjustable span between the shock-absorbing members 114.

Figure 25:
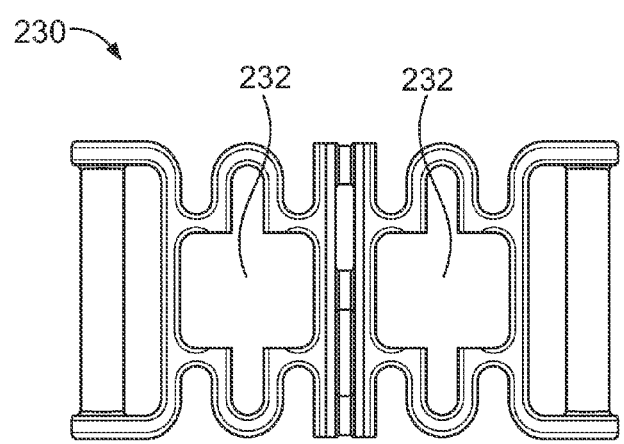
FIG. 25 illustrates a top plan view of a web load-dampening device, according to an embodiment of the present invention.

FIG. 25 illustrates a top plan view of a web load-dampening device 230, according to an embodiment of the present invention. The device 230 is similar to the device 110 shown in FIGS. 10-14, except that instead of four cells, a single interior passage 232 is formed within each shock absorbing member 114 by removing the walls that defined the individual cells shown in FIG. 10, for example. The single interior passage 232 is more flexible and collapsible as compared to the individual cells separated by walls. In other words, cell walls may be removed or added in order to customize the degree of flexibility/shock-absorption desired. Moreover, the larger passages 232 allow thicker and wider straps to pass therethrough.

Thus, embodiments of the present invention provide web load-dampening device that are configured to replace ladder-locks in load bearing web locations, or to be added to current web-adjustment systems. The embodiments of the present invention have been configured to use minimal material while providing maximum shock-absorbing flexibility.

Embodiments of the present invention provide dampening assemblies having shapes that include resilient tensile members that are configured to stretch and flex under extreme loading or shock impact, while being able to snap back to original shapes and orientations once the extreme loading or impact ceases.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A device configured to adjustably retain at least one strap and dampen forces exerted into or by the at least one strap, the device comprising:
    a one-piece main body including two closed strap adjustment channels at opposite terminal ends configured to adjustably retain the at least one strap, wherein said main body is formed of one or more of rubber, plastic resin, polyester, santoprene, thermoplastic elastomer (TPE), or thermoplastic polyurethane (TPU); and
    at least one tensile member formed on or within said main body, wherein said at least one tensile member is configured to flex, bend, and/or stretch in order to absorb the forces exerted into or by the at least one strap.

2. The device of claim 1, wherein said at least one tensile member comprises a plurality of tension bars that are perpendicular to said at least one strap adjustment channel.

3. The device of claim 2, wherein two of said plurality of tension bars are separated by an internal slot formed through said main body.

4. The device of claim 1, wherein said main body further includes inwardly-curved walls integrally connected to rounded ends, wherein a central longitudinal slot is formed within said main body, wherein said central longitudinal slot is perpendicular to said at least one strap adjustment channel, and wherein said at least one tensile member includes two tension members on either side of said longitudinal slot.

5. The device of claim 1, wherein said at least one tensile member comprises a flexible cylinder integrally connected to cylindrical cross beams that are perpendicular to said flexible cylinder, and wherein said at least one strap adjustment channel is formed through at least one of said cylindrical cross beams.

6. The device of claim 1, wherein said main body is rectangular, and wherein said at least one tensile member comprises flexible walls separated by a central rectangular opening.

7. The device of claim 1, wherein said main body resembles an I-beam, and wherein said tensile member comprises a longitudinal post having a rib and recessed edges.

8. The device of claim 1, wherein said at least one tensile member comprises first and second tensile members that are perpendicular with one another.

9. The device of claim 1, wherein said at least one tensile member comprises first and second shock absorbing members integrally connected to a hinge member.

10. The device of claim 9, wherein each of said first and second shock absorbing members comprises a first concave cell connected to intermediate convex cells that are in turn connected to a second concave cell, wherein said first concave cell is connected to a web adjustment member and said second concave cell is connected to said hinge member.

11. The device of claim 10, further comprising a web looped between opposed second concave cells.

12. The device of claim 9, wherein said hinge member comprises a plurality of living hinges.

13. The device of claim 9, wherein each of said first and second shock absorbing members comprises a first concave cell connected to an intermediate convex cell that is in turn connected to a second concave cell, wherein said first and second concave cells each defines a first central cavity, and said intermediate convex cell defines a second central cavity, wherein said second central cavity is larger than said first central cavity, and wherein said first concave cell is connected to a web adjustment member and said second concave cell is connected to said hinge member.

14. The device of claim 9, wherein each of said first and second shock absorbing members comprises first and second convex cells integrally connected to one another through a concave post.

15. The device of claim 9, wherein each of said first and second shock absorbing members comprises a single convex cell integrally connected to said hinge member through a concave post.

16. The device of claim 9, wherein each of said first and second shock absorbing members comprises a single internal passage formed therethrough without any internal walls defining individual cells.

17. The device of claim 1, wherein said at least one tensile member comprises first and second shock absorbing members that are only connected to one another through an adjustable web.

18. A device configured to adjustably retain straps and dampen forces exerted into or by the straps, the device comprising:
    a one-piece main body formed as an integral piece of one or more of rubber, plastic resin, polyester, santoprene, thermoplastic elastomer (TPE), or thermoplastic polyurethane (TPU), wherein said main body includes two closed strap adjustment channels at opposite terminal ends configured to adjustably retain the straps; and
    shock-absorbing members formed on or within said main body, wherein said shock-absorbing members are configured to flex, bend, and/or stretch in order to absorb the forces exerted into or by the straps.

19. A backpack adjustment assembly, the assembly comprising:
    a one-piece main body formed as an integral piece of one or more of rubber, plastic resin, polyester, santoprene, thermoplastic elastomer (TPE), or thermoplastic polyurethane (TPU), wherein said main body includes a first strap adjustment channel at a first end and a second strap adjustment channel at a second end that is opposite said first end;
    a first backpack strap adjustably retained within said first strap adjustment channel;
    a second backpack strap adjustably retained within said second strap adjustment channel; and
    shock-absorbers formed on or within said main body, wherein said shock-absorbers are configured to flex, bend, and/or stretch in order to absorb the forces exerted into or by said first and second backpack straps.

20. The device of claim 1, wherein said main body is formed as an integral piece of one or more of rubber, plastic resin, polyester, santoprene, TPE, or TPU.

21. The device of claim 1, further comprising the at least one strap, wherein the at least one strap adjustment channel adjustably retains the at least one strap.

* * * * *